July 27, 1937.    C. A. TEA ET AL    2,088,450

SHOCK ABSORBER

Filed July 20, 1935

INVENTOR.
CLARK A. TEA AND
ROGER K. LEE.

BY Harness, Lind, Pater & Harris
ATTORNEYS.

Patented July 27, 1937

2,088,450

UNITED STATES PATENT OFFICE 2,088,450

SHOCK ABSORBER

Clark A. Tea, Detroit, and Roger K. Lee, Highland Park, Mich., assignors to Chrysler Corporation, Highland Park, Mich., a corporation of Delaware Application July 20, 1935, Serial No. 32,412

17 Claims. (Cl. 267—9)

This invention relates to a shock absorber.

More particularly the invention pertains to a shock absorber of the friction type for retarding relative movement between the sprung and unsprung portions of a vehicle.

An object of the invention is to provide a device which will produce a retarding effect proportional to the velocity of movement of one portion of the vehicle with respect to another portion thereof.

Another object of the invention is to provide a device of this character which presents a predetermined frictional restraint to initial relative movement of the sprung and unsprung parts of a vehicle and which varies in its frictional restraining action in proportion to the variations of the velocity of relative movement of the sprung and unsprung portions.

Another object of the invention is to provide a vehicle shock absorber which increases the yielding opposition to approaching movement of the sprung and unsprung portions of a vehicle upon initial movement thereof and which thereafter decreases such opposition in proportion to the velocity of movement.

A further object of the invention is to provide a vehicle shock absorber which proportions the yielding opposition to separatory movement of the sprung and unsprung portions of a vehicle directly with respect to the velocity of such movement.

A still further object of the invention is to provide a frictional type shock absorber having a member comprising resilient material which is yieldable in all directions and which is adapted to accommodate substantial tolerances in assembly; and to provide a resilient non-metallic movement retarding element of this character which has effective sound absorbing properties.

Another object of the invention is to provide a vehicle shock absorber having a member comprising a yieldable resilient material which is stressed in shear and compression during separatory movement of the sprung and unsprung portions of a vehicle and which is initially stressed in compression and subsequently subjected to shear and tension during approaching movement of said parts.

Another object of the invention is to provide a retarding device which has a piston comprising rubber.

Another object of the invention is to provide in a device of this character means for maintaining the predetermined frictional restraint to initial movement of the sprung and unsprung portions of a vehicle in either direction.

A further object of the invention is to provide a self-contained piston and cylinder type shock absorber of this kind which is completely sealed against the admission of dirt, dust and other foreign matter.

Other objects of the invention are to provide a piston of this character having passages therethrough for normally accommodating the passage of air from one side to the other side thereof; to provide means for closing said air passages when the velocity of relative movement of the sprung and unsprung vehicle parts exceeds a predetermined value so as to entrap a body of air at one end of the cylinder for cushioning purposes; to provide means of this kind which will entrap a body of air at either end of the cylinder under the foregoing conditions so as to air cushion both separatory and approaching movement of the vehicle parts when the velocity of either of said movements exceeds the predetermined value.

Other objects and advantages of the invention will be more apparent from the following description taken in connection with the accompanying drawing, in which.

Figure 1:
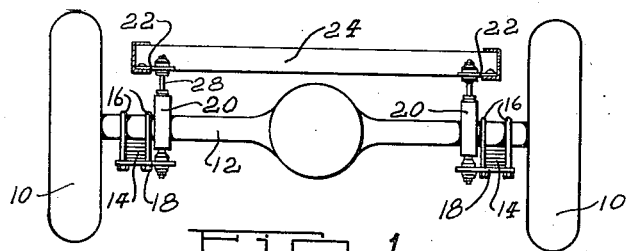
Fig. 1 is a rear elevational view of a vehicle showing the improved shock absorber positioned between the sprung and unsprung portions of the vehicle.
Figure 5:
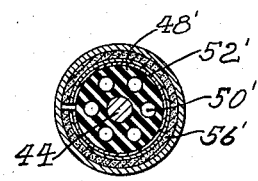
Fig. 5 is a transverse sectional view taken on the line 5—5 of Fig. 4.

Referring to Fig. 1 of the drawing, there is shown a fragmentary view of the rear of a vehicle having road wheels 10 rotatably mounted on a driving axle 12. Springs 14 are attached to the axle 12 by U-bolts 16. Extending inwardly of the vehicle from the U-bolts 16 of each spring is an arm 18 having a free end attached to one of the relatively movable parts of one of the improved shock absorbers 20, respectively. The other relatively movable part of each shock absorber 20 is operatively connected with an arm 22 extending downwardly from and carried by the sprung portion 24 of the vehicle.

Figure 2:
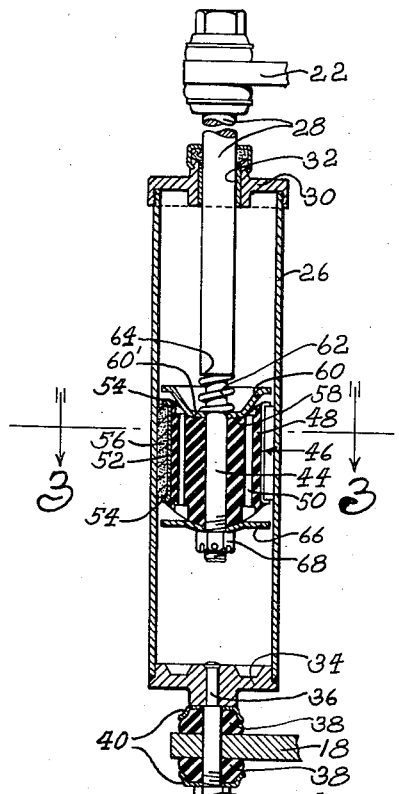
Fig. 2 is a vertical longitudinal sectional view of the shock absorber.
Figure 3:
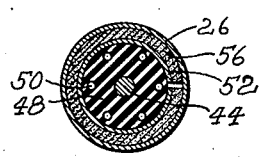
Fig. 3 is a transverse sectional view taken on the line 3—3 of Fig. 2.

In the form of the invention illustrated in Fig. 2, the improved shock absorber or retarding device includes a cylindrical casing 26 into which a piston rod 28 which is operatively connected with the arm 22 carried by the sprung portion 24 of the vehicle. The upper end of the casing 26 has screw threaded thereon a closure member 30 having a central aperture and a suitable bearing 32 for accommodating reciprocation of the rod 28. The opposite or lower end of the casing 26 is closed by welding or otherwise suitably securing a part 34 thereto. The latter part has a central aperture through which is disposed a bolt 36 which passes through aligned apertures in the arm 18, in a pair of rubber elements 38, one of which is positioned on each side of the arm 18, and in a pair of metallic caps 40. A nut 42 is threaded on the lower end of the bolt 36 for retaining the shock absorber in fixed position with respect to the unsprung portion of the vehicle. The shock absorber may be inverted with respect to the position shown on the drawing so as to fix the cylindrical casing 26 to the sprung portion of the vehicle if desired. While there are shown two shock absorbers positioned at the rear of the vehicle, it will be understood that two of such devices are provided at the front of the vehicle.

The inner end of the rod 28 disposed within the casing 26 has a reduced portion 44 which is inserted through the central aperture of a piston, generally designated by the numeral 46, comprising a cylindrical rubber element 48 having longitudinally extending, circumferentially spaced openings 50 to accommodate movement of air from one side of the piston to the other as the latter moves within the casing. Bonded or otherwise suitably secured to the outer periphery of the rubber element 48 is a split metallic ring 52 having radially outwardly projecting upper and lower flanges 54 at its respective opposite ends. A friction lining member 56 having a split section corresponding to the split in the ring 52 is molded or otherwise suitably secured to the ring 52, between the flanges 54, and is adapted to be forced into engagement with the inner surface of the casing 26 as hereinafter described. When relatively yielding friction material is employed the member 56 may comprise a continuous sleeve.

The rubber member 48 of the piston 46 has upper and lower concave and convex faces respectively, the upper face having a central radial portion 58. A metallic cup-shaped washer 60 having a central aperture is carried on the reduced portion 44 of the rod 28 and has a base 60' conforming substantially with the radial portion 58 and is adapted to bear thereagainst when the parts of the shock absorber are in the position illustrated in Fig. 2. The washer 60 has a lesser diameter than the piston 46, the outer periphery terminating short of the outer periphery of the friction member 56. A coil spring 62 surrounds the reduced portion 44 of the rod 28 and has one end bearing against a shoulder 64 formed on the rod 28, the other end bearing against the upper face of the washer 60. A centrally apertured circular plate 66 is positioned on the reduced portion 44 of the rod 28 and bears against the lower convex face of the rubber element 48. The plate 66 has a central concave upper face bearing against the central part of the convex face of the rubber element 48 when the piston is in the position shown in Fig. 2, while the marginal portions thereof are substantially perpendicular to the axis of the piston. The diameter of the plate 66 corresponds with the diameter of the washer 60. The piston 46, washer 60 and plate 66 are retained on the rod 28 by a lock nut 68 screw threaded onto the latter.

When the piston 46 is in the position indicated in Fig. 2, at which time the sprung and unsprung portions of the vehicle are in a normal position, the spring 62 may be compressed sufficiently to exert a pressure on the base 60' of the washer 60 causing the rubber element 48 to be expanded radially outwardly thereby forcing the friction member 56 into frictional engagement with the inner surface of the casing 26. This initial frictional engagement may be predetermined to a given value by varying the compression of the spring 62 through adjustment of the nut 68 axially of the rod 28.

In operation of the shock absorber, as the piston 46 is moved downwardly in response to approaching movement of the sprung and unsprung portions of the vehicle the initial frictional engagement, due to compression of the rubber, tends to decrease by reason of the accompanying stressing of the rubber element 48 in tension. However, the insertion of the frustro-conical end of the washer 60 into the rubber of the upper end of the element 48 expands this end portion radially in proportion to the velocity of the approaching movement of the sprung and unsprung parts and thereby gradually increases the frictional retarding action. This continues so long as the spring 62 is not compressed beyond its initial state. When the spring is compressed beyond its initial condition it accommodates movement of the rod 28 and plate 66 relative to the washer 60. This action decreases the radial expansion of the lower end of the rubber element 48 thereby reducing to some extent the resulting frictional retarding action. If approaching movement of the sprung and unsprung parts be gradual the initial frictional engagement will continue, such gradual movement being insufficient to project the washer 60 into the upper end of or elongate the rubber element 48 enough to materially vary the initial expanded engagement. However, if the approaching movement be sudden, with an increase in velocity some portion of the rubber element 48 will be elongated by the tensional stress exerted thereon and the frictional engagement will tend to lessen but this is more than compensated for by the projection of the washer 60 into the upper end of the element 48 which occurs until the initial compression of the spring 62 is overcome. When the velocity of the approaching movement is of such proportion as to overcome the initial frictional engagement and so distort the piston through elongation of the rubber element thereof that the washer 60 engages substantially the entire upper face of the rubber element, the openings 50 in the latter will be closed to the passage of air within the casing by the washer 60 and the air trapped between the lower end of the casing and the piston will act to further cushion approaching movement of the sprung and unsprung portions of the vehicle.

When the sprung and unsprung portions of the vehicle have reached the extent of their approaching movement there follows a separatory movement of such parts, the tendency of which is to be rather sudden, due to the recoil of the springs 14. This separatory movement causes the piston to be moved upwardly within the casing, the rubber member 48 being stressed in shear and compression. As the rubber element returns to its normal contour following any elongation produced during approaching movement of the vehicle portions, the initial frictional engagement is again obtained. However, as the velocity of the separatory movement increases this initial engagement is augmented by further compression of the rubber member resulting in a radially outwardly directed force which increases the frictional engagement between the member 56 and the inner surface of the casing 26. When the velocity of the separatory movement is of such force as to so distort the piston by compressing the rubber element that the lower convex face thereof is substantially parallel with the plate 66, the air passages 50 will be closed by this plate and the air trapped between the upper end of the casing and the piston will serve to cushion the separatory movement of the sprung and unsprung portions of the vehicle.

When the rubber body portion of the piston is either expanded radially by axial compression or contracted radially by tension in any of the foregoing ways, the extent of these changes in the condition of the rubber varies in proportion to variations in the velocity of movement of the sprung and unsprung parts of the vehicle. Since the force of friction between the piston and the cylinder varies in proportion to the radial expansion and contraction of the rubber of the piston, it, therefore, follows that the retarding action manifested by the shock absorber is in proportion to variations in the velocity of such movements.

Suitable leakage may be provided at either or both end portions of the casing 26 to meter the escapement of air therefrom when the passages 50 are closed during either of the above described movements.

Figure 4:
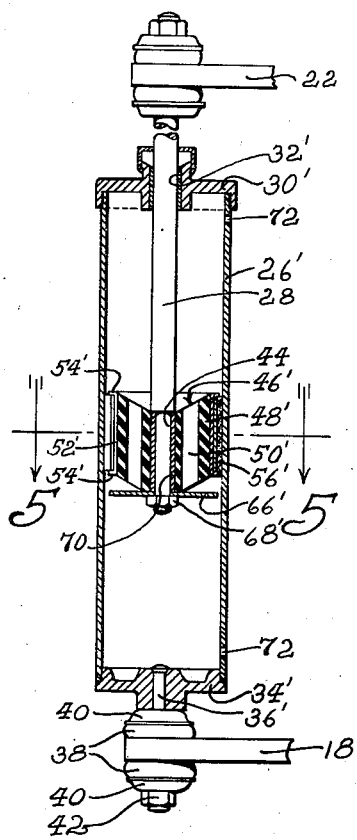
Fig. 4 is a longitudinal sectional view similar to Fig. 2 but showing a modified form of the invention.

In the modified form of the invention illustrated in Fig. 4, the shock absorber includes a cylindrical casing 26' into which extends a portion of the piston rod 28 which is operatively connected with the arm 22 carried by the sprung portion 24 of the vehicle. The upper end of the casing has screw threaded thereon a closure member 30' having a central aperture and a suitable bearing 32' for accommodating reciprocation of the rod 28. The opposite or lower end of the casing 26' is closed by welding or otherwise suitably securing the part 34' thereto. The latter part has a central aperture through which is disposed the bolt 36 which passes through aligned apertures in the arm 18, in the rubber elements 38 and in the metallic caps 40. A nut 42 is threaded onto the lower end of the bolt 36 for retaining the shock absorber in fixed position with respect to the unsprung portion of the vehicle.

The end of the rod 28 disposed within the casing 26' has a reduced portion 44 which is inserted in a cylindrical sleeve 70, the latter being bonded to the adjacent surface of a longitudinal central aperture of the piston 46'. The piston comprises a cylindrical rubber element 48' having longitudinally extending circumferentially spaced openings 50' to accommodate movement of air from one side of the piston to the other as the latter moves within the casing. The rubber part 48' has upper and lower concave and convex faces respectively. Bonded or otherwise secured to the outer periphery of the rubber 48' is a split metallic ring 52' having radially outwardly projecting upper and lower flanges 54'. A frictional lining member 56' having a split section corresponding to the split in the ring 52' is molded or otherwise secured to the ring 52', between the flanges 54', and is adapted to be forced into engagement with the inner surface of the casing 26'. A centrally apertured plate 66' is positioned on the reduced portion 44 of the rod 28 and bears against the lower face of the rubber. The piston 46' and plate 66' are retained on the rod 28 by a nut 68'.

In the operation of the device illustrated in Fig. 4, the shock absorber parts are shown in the position assumed when the sprung and unsprung portions of the vehicle are in their normal position, at which time the piston exerts a predetermined frictional restraint through engagement with the casing to initial movement of the vehicle portions. The rubber element 48' is subjected to a stress in shear and compression. As the piston is moved downwardly in response to approaching movement of the vehicle parts the rubber element 48' is elongated through a tensional stress. If this movement be gradual and of a relatively slight force the initial frictional restraint will continue, such movement being insufficient to elongate the rubber element 48' and relieve the initial frictional restraint. However, if the approaching movement be sudden and of an increased velocity the rubber 48' will be elongated sufficiently by the tensional stress to overcome the initial restraint.

When the sprung and unsprung portions of the vehicle have reached the extent of their approaching movement there follows a separatory movement of such portions, due to the recoil action of the springs 14. This movement causes the piston to be moved upwardly within the casing, the rubber 48' being stresses in shear and compression. As the piston returns to its normal contour following any elongation during the approaching movement, the initial restraint is again obtained. However, as the velocity of the separatory movement increases this initial restraint is augmented by further compression of the rubber, in response to an upward pull, as viewed in Fig. 4, the tendency of which is to expand the piston outwardly and to cause the upper and lower faces of the rubber element to assume a substantially flat surface.

The casing 26' has openings 72 adjacent the upper and lower end portions providing for the escapement of air. If desired the upper opening may be omitted and when the velocity of movement imparted to the piston during separatory movement is sufficient to so distort the rubber 48' that the lower face thereof is substantially flat the plate 66' will close the openings 50', the air entrapped between the piston and upper end of the casing serving to cushion separatory movement of the vehicle portions.

What we claim is:

1. In a device of the class described comprising a casing, a piston including a body portion comprising yieldable material and having a frictional element in engagement with the inner surface of said casing, said body portion of said piston being so constructed and arranged as to stress part of the yieldable material axially of said piston in tension during relative movement of the piston and casing in one direction and to stress said material axially in compression during relative movement thereof in the opposite direction.

2. In a vehicle having sprung and unsprung parts; a shock absorber arranged therebetween and comprising a casing, a piston in said casing in frictional engagement therewith and adapted to exert a force of friction and frictional retarding effect in proportion to the variations in velocity of movement of said parts, said piston having a passage therein, and means associated with said piston for closing said passage in response to movement of said parts.

3. In a vehicle having sprung and unsprung parts; a retarding device comprising slidably related frictionally engaged members adapted to control relative movement between said parts, said device being so constructed and arranged as to exert a frictional retarding action in proportion to variations in the velocity of movement of said parts, and means for entrapping air between selected portions of said members when the velocity of said movement has reached a predetermined value so as to augment said frictional retarding action by pneumatically retarding further movement of said vehicle parts.

4. In a vehicle having relatively movable sprung and unsprung parts; a retarding device adapted to control movement therebetween and including a casing, a piston in said casing comprising a yieldable material and a friction material, said piston having a predetermined frictional engagement with said casing for exerting an initial retarding effect to movement of said parts, said yieldable material being deformable to increase the retarding effect during relative movement of said parts in one direction and to decrease said retarding effect during relative movement of said parts in an opposite direction.

5. In a vehicle having relatively movable sprung and unsprung parts; a retarding device adapted to control movement therebetween and including a casing, a piston in said casing comprising a yieldable material and a friction material, said piston having a predetermined frictional engagement with said casing for exerting an initial retarding effect to movement of said parts, said yieldable material being deformable to vary the retarding effect in proportion to variations in the velocity of movement of said parts, and means associated with said piston for creating a pneumatic resistance to movement of said parts when the velocity of said movement exceeds a predetermined value.

6. In a vehicle having sprung and unsprung parts; a frictional retarding device for controlling relative movement of said parts in a direction from a normal position including a cylinder attached to one of said parts, and a piston mainly comprising rubber attached to the other part and frictionally engaged in said cylinder, said piston being so constructed and arranged as to exert a gradually increasing retarding action when the velocity of movement of said parts in said direction is increased and does not exceed a predetermined value and to exert a gradually decreasing retarding action as the velocity of movement increases beyond said predetermined value.

7. In a vehicle having sprung and unsprung parts; a frictional retarding device for controlling relative movement of said parts in a direction from a normal position, said device including a casing, and a piston member reciprocally mounted in said casing having a surface in frictional engagement therewith and including yieldable material and having means for compressing said yieldable material to urge said surface into frictional engagement with said casing for exerting an initial predetermined retarding action, said means being so constructed and arranged as to cause a gradually increasing retarding action to be exerted to movement in said direction when the velocity of movement of said parts in said direction does not exceed a predetermined value and to exert a gradually decreasing retarding action proportional to variations in the velocity of movement of said parts in said direction when the velocity of movement thereof exceeds said predetermined value.

8. In a vehicle having sprung and unsprung parts; a frictional retarding device for controlling relative movement of said parts in a direction from a normal position comprising a cylinder having a piston rod slidably mounted therein; a piston mounted on said rod including a rubber body portion having a wall normally held substantially throughout its length against radially inward expansion and having a face protruding from one end thereof, a frictional element on said body portion frictionally engaged with said cylinder, an abutment on said rod for coacting with the protruding face of said body portion to limit relative movement of said piston and rod in one direction for increasing the force of frictional engagement between said frictional element and said cylinder, a pressure member slidably mounted on said rod and abutting the other end of said body portion, and a resilient member bearing between said rod and said pressure member for holding said body portion under an initial predetermined compression and adapted to limit expansion of said body portion during movement of said piston in an opposite direction relative to said cylinder after such movement has attained a predetermined velocity.

9. In a vehicle including sprung and unsprung parts having resilient supporting means therebetween; a shock absorber comprising a cylinder secured to one of said parts and a rod secured to the other of said parts and slidable in said cylinder, a piston comprising a body portion of yieldable material mounted on said rod and having a portion protruding from one end thereof, a frictional element on said piston in frictional engagement with said cylinder, an abutment on said rod for coacting with said protruding portion to expand said body portion radially during rebound action of said resilient supporting means, a pressure member slidably mounted on said rod and engaging the opposite end of said yieldable body portion of said piston, a resilient element bearing between said rod and said pressure member normally holding said yieldable body portion in an initially radially expanded condition, said pressure member being adapted to gradually increase radial expansion of a part of said yieldable body portion during compression of said resilient supporting means and while said resilient element is under compression greater than said initial compression, said resilient element being adapted to accommodate movement of said rod relative to said pressure member when its initial compression is exceeded so as to release the radial expansion of said yieldable body portion during compression of said resilient supporting means at a velocity exceeding a predetermined value.

10. A shock absorber for controlling relative movement of the sprung and unsprung parts of a vehicle including a tubular member securable to one of said vehicle parts, a piston rod reciprocable in said tubular member and having an external end securable to the other vehicle part, a piston on the inner end of said rod having a surface frictionally engaged with said tubular member and comprising a rubber body portion having a substantially rigid member bonded thereto, said rubber body portion having a protruding end part extending beyond said rigid member, and an abutment on said rod engaging said protruding end part for axially compressing a part of said body portion and expanding the same radially of said piston during movement of said rod relative to said surface, said abutment being engageable with said rigid member for limiting compression of said body portion.

11. A shock absorber for controlling relative movement of the sprung and unsprung parts of a vehicle including a tubular member securable to one of said vehicle parts, a piston rod reciprocable in said tubular member and having an external end securable to the other vehicle part, a piston on the inner end portion of said rod having a surface frictionally engaged with said tubular member and comprising a yieldable non-metallic body portion having an aperture for receiving said rod and having wall portions surrounding the latter and held against inward expansion, and an abutment on said rod engaging an end of said yieldable body portion for compressing parts of the latter axially and expanding the same radially outwardly during the initial range of movement of said rod relative to said surface.

12. A shock absorber for controlling relative movement of the sprung and unsprung parts of a vehicle including a tubular member securable to one of said vehicle parts, a piston rod reciprocable in said tubular member and having an external end securable to the other vehicle part, a piston on the inner end portion of said rod having a surface frictionally engaged with said tubular member and comprising a rubber body portion provided with an aperture for receiving said rod and having wall portions surrounding said rod and held against inward expansion, said rubber body portion having a tapering extremity, and an abutment on said rod normally engaging a limited portion of said tapering extremity and adapted to engage progressively increasing portions of said tapering extremity during correspondingly increasing increments of movement of said rod relative to said surface.

13. A shock absorber for controlling relative movement of the sprung and unsprung parts of a vehicle including a tubular member securable to one of said vehicle parts, a piston rod reciprocable in said tubular member and having an external end securable to the other vehicle part, a piston on the inner end portion of said rod having a surface frictionally engaged with said tubular member and comprising a yieldable nonmetallic body portion having an aperture for receiving said rod and having wall portions surrounding the latter and held against inward expansion, and an abutment on said rod adjacent an extremity of said yieldable body portion and having a projection thereon registering with and adapted to be depressed into the yieldable material of the central portion of said extremity of said yieldable body portion during movement of said rod relative to said surface for expanding a part of said yieldable body portion radially of said piston.

14. A shock absorber for controlling relative movement of the sprung and unsprung parts of a vehicle including a tubular member securable to one of said vehicle parts, a piston rod reciprocable in said tubular member and having an external end securable to the other vehicle part, a piston on the inner end portion of said rod having a surface frictionally engaged with said tubular member and comprising a yieldable nonmetallic body portion having an aperture for receiving said rod and having wall portions surrounding the latter and held against inward expansion, an abutment on said rod adjacent an extremity of said yieldable body portion and having a projection thereon registering with and adapted to be depressed into the yieldable material of the central portion of said extremity of said yieldable body portion during movement of said rod relative to said surface for expanding a part of said yieldable body portion radially of said piston, and a yieldable resilient member bearing between said rod and said abutment for limiting depression of said projection into said yieldable body portion during a predetermined range of movement of said rod relative to said surface.

15. A shock absorber for controlling relative movement of the sprung and unsprung parts of a vehicle including a tubular member securable to one of said vehicle parts, a piston rod reciprocable in said tubular member and having an external end securable to the other vehicle part, a piston on the inner end portion of said rod having a surface frictionally engaging said tubular member comprising a rubber body portion having an aperture for receiving said rod and having means within said aperture for holding the material of said body portion against inward expansion toward said rod, and an abutment on said rod engaging an end of said rubber body portion for compressing parts of said body portion axially and expanding the same radially outwardly during movement of said rod relative to said surface.

16. A shock absorber for controlling relative movement of the sprung and unsprung parts of a vehicle including a tubular member securable to one of said vehicle parts; a piston rod reciprocable in said tubular member and having an external end securable to the other vehicle part; a piston on the inner end of said rod including a rubber cylindrical member, having an aperture for receiving said rod and having a metal sleeve on and bonded to its outer periphery, said piston having a friction lining member carried by said sleeve and having means in said aperture between said rubber member and said rod for holding said rubber member against inward expansion toward said rod, and an abutment on said rod engageable with an extremity of said rubber member for compressing parts of the same axially and expanding portions of said rubber member radially outwardly during movement of said rod axially relative to said friction lining.

17. A shock absorber including a casing, a piston reciprocable in said casing having a surface frictionally engaged with the inner surface of said casing and including a body portion comprising rubber, said piston being so constructed and arranged as to stress part of the yieldable material axially of said piston in tension during a portion of the range of relative movement of said piston and casing in one direction and to stress said material axially in compression during relative movement thereof in the opposite direction.

CLARK A. TEA.
      ROGER K. LEE.